United States Patent
MacLeod

(10) Patent No.: US 7,245,673 B2
(45) Date of Patent: Jul. 17, 2007

(54) WINDOWED MULTIUSER DETECTION

(75) Inventor: Robert B. MacLeod, Nashua, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 618 days.

(21) Appl. No.: 10/486,871

(22) PCT Filed: Jun. 25, 2003

(86) PCT No.: PCT/US03/20098

§ 371 (c)(1), (2), (4) Date: Feb. 11, 2004

(87) PCT Pub. No.: WO2005/010772

PCT Pub. Date: Feb. 3, 2005

(65) Prior Publication Data

US 2004/0267957 A1 Dec. 30, 2004

(51) Int. Cl.
H03D 1/00 (2006.01)

(52) U.S. Cl. ............... 375/340; 706/236; 329/341

(58) Field of Classification Search ............ 375/340, 375/341, 316, 343, 346, 348, 349, 148, 130–147; 370/342, 335
See application file for complete search history.

(56) References Cited

U.S. PATENT DOCUMENTS

| 5,432,821 | A | * | 7/1995 | Polydoros et al. | 375/340 |
| 6,301,293 | B1 | * | 10/2001 | Huang et al. | 375/130 |
| 6,654,365 | B1 | * | 11/2003 | Sylvester et al. | 370/342 |
| 6,714,527 | B2 | * | 3/2004 | Kim et al. | 370/335 |
| 7,099,377 | B2 | * | 8/2006 | Berens et al. | 375/130 |
| 7,136,369 | B2 | * | 11/2006 | Reznik et al. | 370/342 |
| 2002/0037061 | A1 | | 3/2002 | Learned | |
| 2002/0118778 | A1 | * | 8/2002 | Sipila | 375/341 |
| 2003/0012263 | A1 | | 1/2003 | Lu | |

OTHER PUBLICATIONS

Shikh-Bahaei, Mohammad-Reza et al, A Statistical Processing Approach to Interference Cancellation in W-CDMA Systems, IEICE Trans. Commun., Aug. 2000, pp. 1619-1630, vol. E83-B, No. 8.

* cited by examiner

Primary Examiner—David C. Payne
Assistant Examiner—Rahel Guarino
(74) Attorney, Agent, or Firm—Maine & Asmus

(57) ABSTRACT

Windowed multiuser detection techniques are disclosed. A window of data is established, and certain central bits within the window are selected as reliable, while other side bits are ignored. The selected bits are demodulated. The windowed multiuser detector moves along to the next window in such a manner that the next group of central bit decisions lay contiguous with the previous set, and eventually every bit to be demodulated has at some point been a central bit decision. Most any type of MUD algorithm (e.g., MMSE algorithm MUD or M-algorithm MUD) can be used to compute estimates in the windowed data. Unreliable windowed data are distinguished from reliable data (e.g., weighting or other de-emphasis scheme).

20 Claims, 9 Drawing Sheets

WINDOWED MULTIUSER DETECTION

RELATED APPLICATIONS

This application is related to U.S. Pat. No. 7,110,439 filed Mar. 25, 2002. In addition, this application is related to U.S. Pat. No. 6,947,502 filed Aug. 26, 2002. This application is also related to U.S. Pat. No. 7,092,452 filed Apr. 25, 2003. Each of these patents is herein incorporated in its entirety by reference.

FIELD OF THE INVENTION

The invention relates to telecommunications, and more particularly, to a technique for performing windowed multiuser detection.

BACKGROUND OF THE INVENTION

Receivers for digital communications systems are becoming available which can handle several transmissions simultaneously. Such receivers typically make use of multiuser detection, commonly referred to as MUD. Multiuser detection is a means by which several signals, either completely or partially occupying a single communications channel, can be separated mathematically.

To operate, a MUD receiver must have the received data available, and must have knowledge of the basic waveform transmitted at each transmitter, as appearing in the receiver. This basic waveform is commonly referred to as a composite signature waveform. Each transmission's composite signature waveform is the waveform that would be present in the receiver, if only one data symbol had been transmitted by each transmitter individually. These waveforms each define a column in an 'S' matrix in the MUD receiver, sometimes called the signature matrix.

When a receiver is operating in an asynchronous environment with inter-symbol interference, the structure of the S-matrix becomes more complicated. In particular, the asynchronicity will delay individual columns of the S-matrix, causing signals which once lined-up to shift with respect to each other. Furthermore, an inter-symbol interference problem will be reflected in waveforms (columns of the S matrix) which extend beyond the boundaries of what is normally attributed to a symbol. These problems conspire to alter the way a multiuser detection system works.

In more detail, for a completely synchronous system, with waveforms that do not extend beyond the boundaries of a symbol decision, demodulation of a series of symbols can be accomplished without loss of optimality, by breaking the problem up into individual symbol-by-symbol demodulations. This is mathematically possible because the S matrix is block-diagonal, and the problem naturally separates. Referring to FIG. 1$a$, in such a completely synchronous case, the larger MUD problem r=S*b is separable into (as many bits are in a frame) several smaller problems, $r_i = S * b_1$. Each of the sub-matrices S are identical, and just shifted in time to make up the larger matrix S, which covers the whole frame of data.

However, in an asynchronous system, the MUD receiver is faced with an inseparability problem, where the columns of the S matrix are overlapping, mixing together the contributions of $S * b_i$ in the received data. As individual signals are allowed to be asynchronous, the waveforms due to each overlap in complicated ways, introducing dependencies amongst bit decisions. These dependencies typically inter-relate (a→b→c etc.) in such a way that even a small level asynchronous reception can result in a whole frame of data that has inter-related bits. This asynchronous situation is depicted in FIG. 1$b$. Note that the individual S sub-matrices making up S matrix are overlapping in time. Thus, a system of ensuring separability at the receiver must be employed, by limiting the time response of each transmission, combined with some means of synchronizing each source.

Achieving synchronization of the several sources at the receiver, however, is not trivial, and can be difficult to achieve. Resources of the system (as reflected in the overhead of transmitting control messages) must be spent to control the exact timing of each source. In addition, if the temporal response of each transmission must be reduced to further ensure the separability, this will result in a larger bandwidth of signal, which also spends resources of the system by reducing available frequency bands for transmission. Generally stated, demodulation of a frame's worth of data in an asynchronous system with inter-symbol interference is typically unfeasible. In all but academic situations, the MUD module needed in such a case would be prohibitively complicated.

What is needed, therefore, is a solution to the problem of the computational complexity of a multiuser detector (any variety) when a large number of symbols need to be jointly demodulated, and in particular, when either asynchronous reception or intersymbol interference is encountered.

BRIEF SUMMARY OF THE INVENTION

One embodiment of the present invention provides a method for performing windowed multiuser detection in a multiuser communication system having a plurality of users. The method includes receiving signal data including an intended signal for a user and one or more interference signals for other users of the system. The method proceeds with breaking the received signal data up into subwindows, with each subwindow including data required to compute a number of symbol estimates. The subwindows are overlapping in time such that portions of the received data are included in two subwindows.

The method further includes computing a vector of symbol estimates for each subwindow, each vector of symbol estimates including a central portion and two adjacent side portions. The method proceeds with copying only symbol estimates from the central portion of each symbol estimate vector to a symbol matrix, the symbol matrix being an L by K matrix, where L is equal to the number of subwindows and K is equal to the number of users. The method may further include discarding symbol estimates included in the adjacent side portions of each symbol estimate vector.

In one such embodiment, computing a vector of symbol estimates includes computing prior data that is indicative of the symbol estimates of each symbol estimate vector based on a multivariate probability density function. Each symbol estimate may contribute to an overall probability, and symbol estimates close to computed prior data are very likely. Contributions due to the prior probabilities may be separately accounted for algorithmically, thereby simplifying likelihood decisions. Computing a vector of symbol estimates for each subwindow is carried out, for example, with a minimum mean squared error MUD algorithm or an M MUD algorithm.

In one particular embodiment, the computing a vector of symbol estimates for each subwindow further includes assigning a different noise power to each symbol decision associated with a subwindow, thereby making symbol estimates associated with the central portion of a symbol estimate vector distinguishable from symbol estimates associated with the two adjacent side portions to facilitate the copying. Here, assigning a different noise power to each symbol decision is carried out, for example, by assigning each symbol decision a nominal noise power, and inflating the noise power of symbol, decision associated with the two adjacent side portions, thereby designating unknown waveforms overlapping each subwindow. This assigning a different noise power to each symbol decision can be based on a noise weighting function.

Another embodiment of the present invention provides a windowed multiuser receiver for performing windowed multiuser detection in a multiuser communication system having a plurality of users. The receiver includes an input module adapted to receive signal data including an intended signal for a corresponding user and one or more interference signals for other users of the system. This input module is further adapted to break the received signal data up into subwindows, each subwindow including data required to compute a number of symbol estimates. The subwindows are overlapping in time such that portions of the received data are included in two subwindows. The receiver further includes one or more MUD kernals, each adapted to compute a vector of symbol estimates for a corresponding subwindow, each vector of symbol estimates including a central portion and two adjacent side portions. The receiver further includes an output module that is adapted to copy only symbol estimates from the central portion of each symbol estimate vector to a symbol matrix, the symbol matrix being an L by K matrix, where L is equal to the number of subwindows and K is equal to the number of users. Each of the input and output modules, as well as the MUD kernals, can be implemented, for example, as a set of instructions executing on one or more processors. Alternatively, the set of instructions may be encoded on one or more processor readable mediums (e.g., compact disk or server).

In one such embodiment, the receiver further includes one or more S matrix formatter modules, each adapted to receive parameter data including copies of signature waveforms to be demodulated for each user, and to provide S matrix data to a corresponding MUD kernal. One or more prior data formatter modules are also included, each adapted to receive corresponding prior symbol estimates, and to output to a corresponding MUD kernal a vector of symbols corresponding to the subwindow of data being processed. Note that the one or more MUD kernals can each be configured with any one of a number of MUD algorithms (minimum mean squared error MUD algorithm or an M MUD algorithm).

The one or more MUD kernals can each be further configured to assign a different noise power to each symbol decision associated with a subwindow, thereby making symbol estimates associated with the central portion of a symbol estimate vector distinguishable from symbol estimates associated with the two adjacent side portions. In one such embodiment, each of the one or more MUD kernals assigns each symbol decision a nominal noise power, and inflates the noise power of symbol decisions associated with the two adjacent side portions, thereby designating unknown waveforms overlapping each subwindow. In another embodiment, each of the one or more MUD kernals each includes a likelihood function that is configured to reduce the impact of bit decisions associated with the two adjacent side portions based on an assigned noise power reliability metric.

Another embodiment of the present invention provides a method for performing windowed multiuser detection in a multiuser communication system having a plurality of users.

The method includes receiving signal data including an intended signal for a user and one or more interference signals for other users of the system. The method proceeds with breaking the received signal data up into subwindows, where the subwindows are overlapping in time such that portions of the received data are included in two or more subwindows. The method further continues with computing a vector of bit estimates for a current subwindow, the vector including a central portion and two adjacent side portions. The method further includes copying only bit estimates from the central portion of the bit estimate vector to a bit matrix, the bit matrix being an L by K matrix, where L is equal to the number of subwindows and K is equal to the number of users. The computing and copying may be repeated until each subwindow is processed.

In one particular embodiment, the method further includes assigning each bit decision associated with a subwindow a reliability metric that is functionally related to the temporal distance of the corresponding bit from the central portion, thereby distinguishing reliable bit estimates from non-reliable bit estimates to facilitate the copying. Assigning each bit decision a reliability metric includes, for example, assigning individual noise statistics to each bit estimate.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4b illustrates a detailed block diagram showing an unwrapped layout of the Turbo MUD processing element of FIG. 4a.

DETAILED DESCRIPTION OF THE INVENTION

Embodiments of the present invention enable the joint demodulation of large blocks of data, with minimal loss of performance. The described techniques are flexible enough that a sub-optimal system can be designed for a large variety of situations, even under extreme cases of inter-symbol interference and asynchronous transmission. Generally, a series of lower order local MUD demodulations are performed, and constructed in such a way that the results can be reassembled as an approximate solution to the full joint demodulation.

Overview

Figure 1:
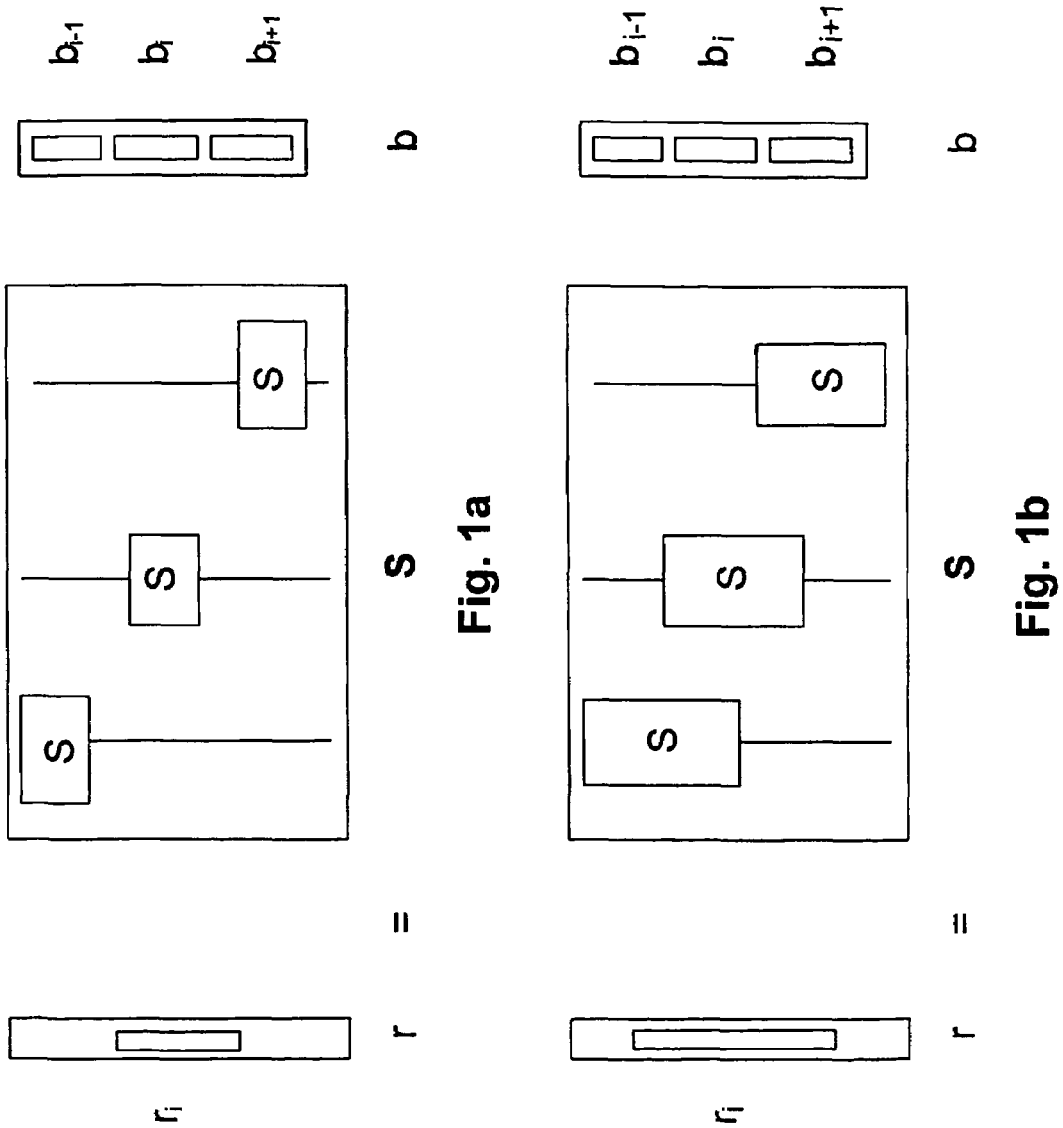
FIG. 1a mathematically illustrates a synchronous multiuser system, where the columns of the S matrix are non-overlapping.
FIG. 1b mathematically illustrates a asynchronous multiuser system, where the columns of the S matrix are overlapping.
Figure 2:
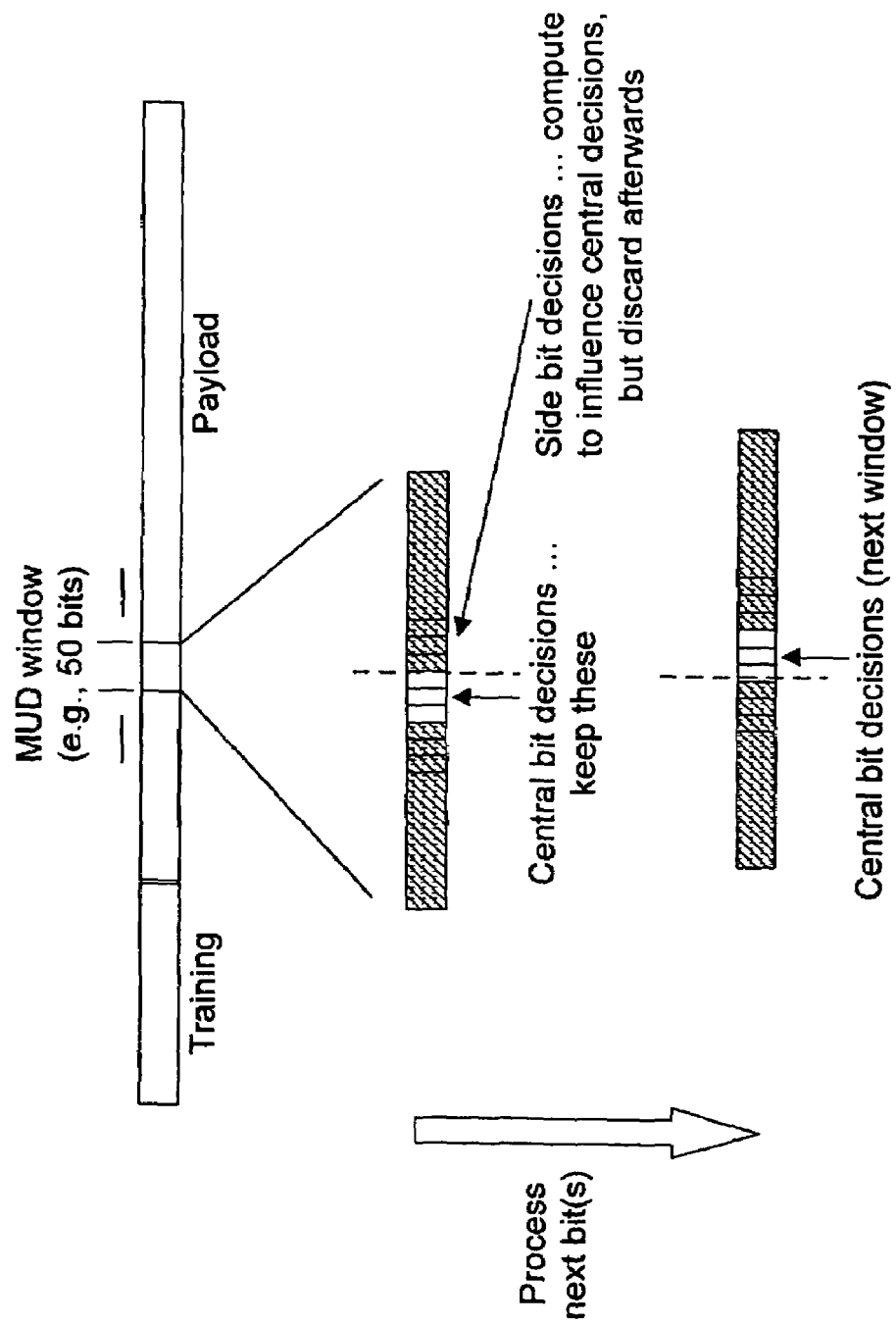
FIG. 2 illustrates the general operation of a windowed multiuser detector configured in accordance with one embodiment of the present invention.

FIG. 2 illustrates the general operation of a windowed multiuser detector configured in accordance with one embodiment of the present invention. The data to be demodulated is designated payload, which represents the blocks of data due to several transmissions which have arrived at the receiver, generally at the same time, but out of sync with each other. Each transmission may have sent several hundred to approximately one thousand bits of information in each respective payload.

In operation, the windowed multiuser detector selects a small number of these bits to demodulate, which is designated as the MUD window in FIG. 2. In this particular example, the number of bits is 50. This selection will correspond to a window in time long enough to contain the responses of all the bits to be demodulated at this point of the algorithm. The algorithm generally includes establishing a window of data, selecting bits within the window (e.g., 1 bit +/−N_side_bits)×N_users, ignoring other bits which may have responses with tails in the window, demodulating selected bits, and discarding all but central bit decisions. The windowed multiuser detector would then move along to the next window in such a manner that the next group of central bit decisions lay contiguous with the previous set, and eventually every bit to be demodulated has at some point been a central bit decision.

Most any type of MUD algorithm can be used to compute bit decisions in the windowed data. In one particular embodiment, an MMSE algorithm can be used, which would compute for each bit decision k:

$$\hat{b}_k = sgn\left\{\frac{1}{A_k}([S^hS + \sigma^2 A^{-2}]^{-1} S^h r)_k\right\}. \quad (1)$$

With the windowed multiuser detector, a further refinement is possible. Since bit decisions at the edges of the window have interfering bits and associated waveforms that have not been accounted for in the current window, the MMSE detector can be modified to de-emphasize these decisions. This can be done by assigning individual noise statistics to each decision, higher power near the edges:

$$\hat{b}_k = sgn\left\{\frac{1}{A_k}([S^hS + \sigma_k^2 A^{-2}]^{-1} S^h r)_k\right\}. \quad (2)$$

Similarly, an M Algorithm MUD detector could be modified to work in the Windowed MUD framework. Specifically, since each path metric computed corresponds to a bit decision, each path could also be assigned an importance or reliability metric. This metric would be functionally related to the temporal distance of the bit from the central portion of the window, with bits near the edges being labeled unreliable, and receiving a weak reliability figure. This figure could be combined with the normal metric for the bit decision (e.g., multiplicatively) to de-emphasize the contributions to the overall metric of non-centrally located bits.

Turbo Multiuser Detection

The processing and means by which data and other ancillary parameters enter into the MUD processing module, and in turn, the windowed multiuser detector, will now be described. For purposes of discussion, the MUD processing employed is assumed to be Turbo MUD.

Figure 3:
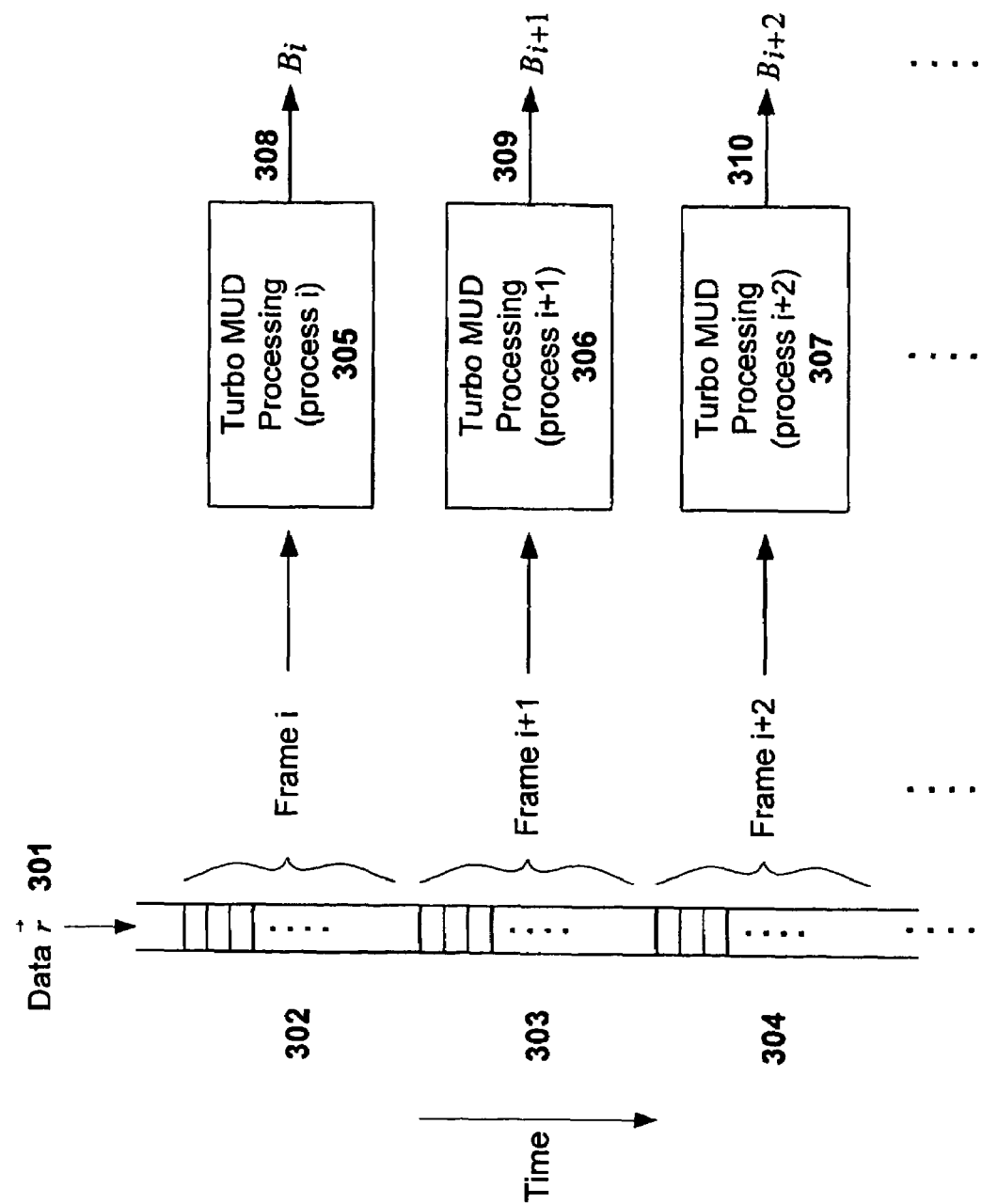
FIG. 3 illustrates a time series of data $\vec{r}$ 301 entering a MUD processor configured in accordance with one embodiment of the present invention.

FIG. 3 shows a time series of data $\vec{r}$ 301 entering the MUD processor at the left. As the data enters the processor, contiguous blocks of data are collected together into frames (302, 303, 304), and passed onto Turbo MUD processing elements. There is a separate Turbo MUD process (305, 306, 307) for each frame of data, which may imply completely unique physical processing elements, or re-use of the same processing element. For example, if the processing to be accomplished in Turbo MUD process 305 could be completed before the next frame of data 303 is ready, the same physical processor could be tasked to run Turbo MUD process 306.

Each of the Turbo MUD processes (305, 306, 307) takes in a number of samples M of data called a frame, and outputs a L by K matrix of demodulated bits $B_i$. Each column of this matrix is a sequence of L bits due to the $k^{th}$ user being demodulated. The samples of data actually used to make up the frames (302, 303, 304) may or may not be re-used in the preceding or subsequent frames. For example, the last two samples of frame 302 may also be passed into frame 303 as the first two samples.

Breaking the processing up into frames (302, 303, 304) provides a number of benefits. For example, timely results (308, 309, 310) can be processed and output so that, for example, a conversation can take place without waiting for entire sentences, paragraphs, etc. to be transmitted. In addition, it is customary that the data transmitted is coded at the source, and must be decoded by the Turbo MUD to retrieve the data. Such coding/decoding situations typically code packets or frames of data, and decode accordingly.

Figure 4A:
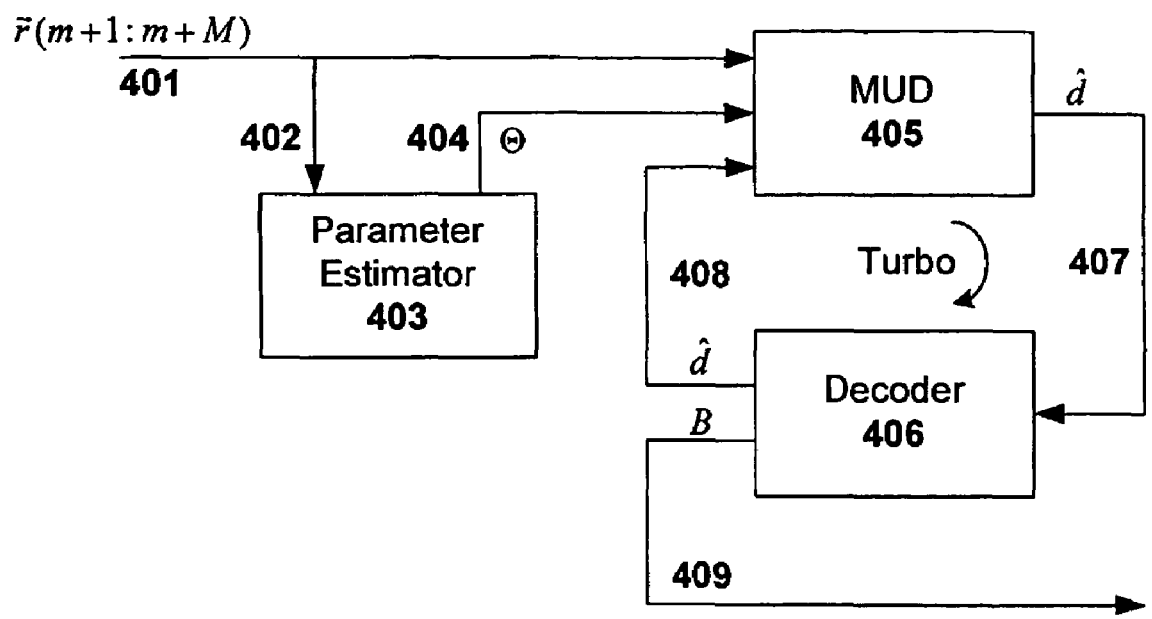
FIG. 4a illustrates the basic layout of a Turbo MUD processing element configured in accordance with one embodiment of the present invention.
Figure 4B:
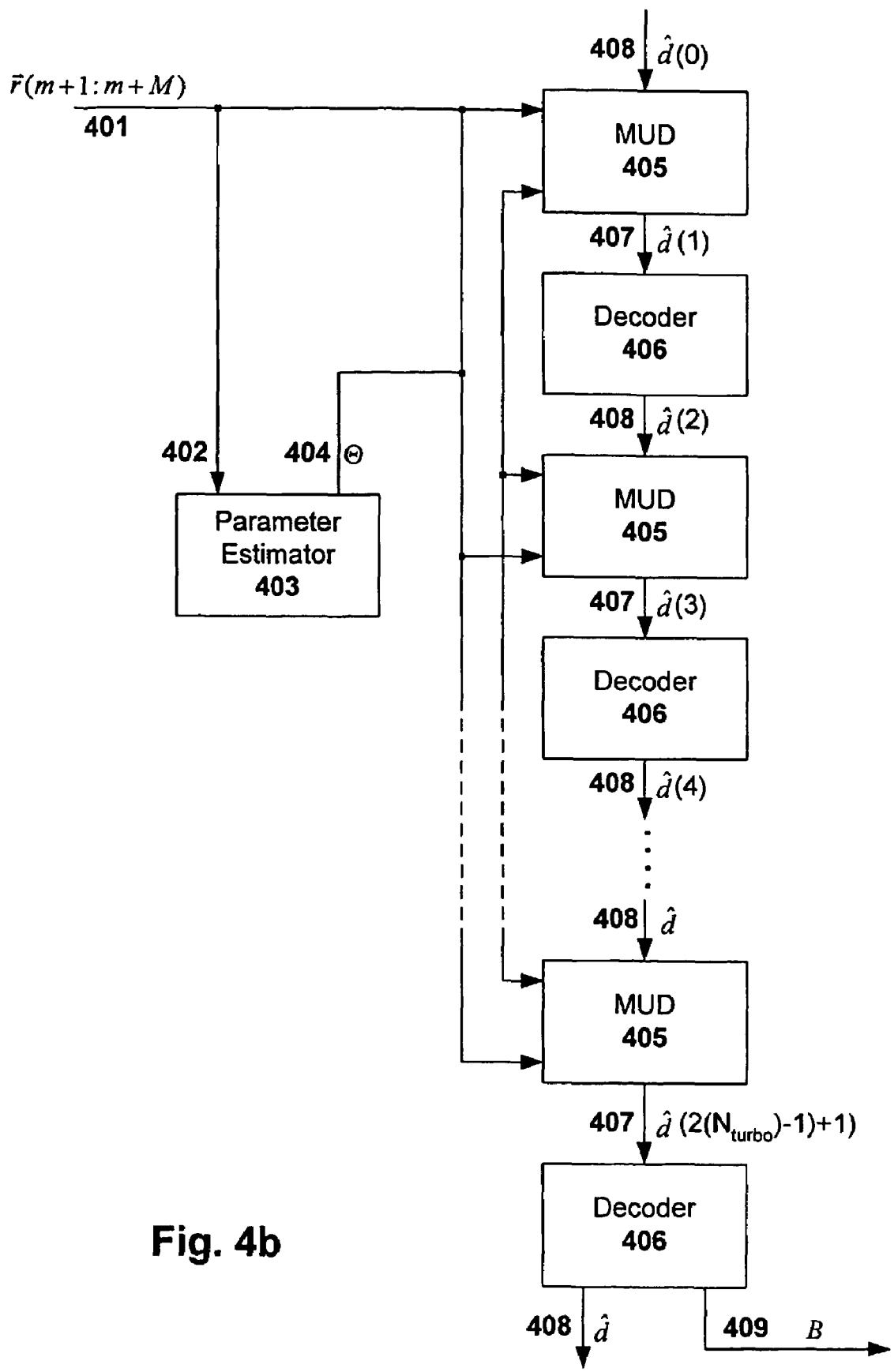

FIG. 4a illustrates the basic layout of a Turbo MUD processing element, while FIG. 4b illustrates a more detailed block diagram showing the full unwrapped layout of a Turbo MUD processing element configured. These figures are used to explain how Turbo MUD works.

As can be seen in FIG. 4a, a frame of data $\vec{r}$ (m+1:m+M) 401 is provided to the Turbo MUD processing element. This is a vector of M samples of data, offset m samples into the received data stream. This data is made available to both the parameter estimation module 403 via path 402, and the MUD module 405. In the alternate notation of FIG. 4b, it can be seen that for Turbo MUD, several copies of the MUD module 405 are implied, one for each of $N_{turbo}$ turbo iterations. FIG. 4a is a shorthand notation for describing this iterative MUD process.

Note that each of the MUD modules 405 shown in FIG. 4b are not run in parallel. Rather each one is run in turn as the three inputs to each are made valid. The three inputs to each MUD module 405 are the data 401 (always valid), parameters Θ 404 (simultaneously available and valid to all MUD modules 405 as soon as module 403 parameter estimation is completed), and the previously decoded symbols $\hat{d}(t)$ 408. The previously decoded symbols $\hat{d}(t)$ 408 are not made valid until they have been either initiated, or one of the decoding modules 406 has computed them. Note that these previously decoded symbols d̂(t) 408 are actually a matrix of symbols, $N_{symbols}$ by K users in dimension.

The number of symbols in a frame of data is related to the number of bits in a frame and the modulation scheme. For example, for a half rate code and BPSK modulation, there would be $N_{symbols}=2*L$ symbols in a frame. Each of these matrices of symbols d̂(t) 408 corresponds uniquely to some matrix B of decoded bits, but these bits are not required by the Turbo MUD, and as such are not shown as being passed back and forth in the turbo loop. At the last decode stage, however, the matrix B of decoded bits is computed and passed out of the algorithm of a particular Turbo MUD process (e.g., 305, 306, or 307).

A method performed by a Turbo MUD process (e.g., 305, 306, or 307) in accordance with one embodiment of the present invention proceeds as follows, with reference to FIGS. 4a and 4b. The method begins with copying or otherwise providing data $\vec{r}$ (m+1:m+M) to path 401, thereby making that data available to all processing elements 405 and parameter estimator 403. The method proceeds with computing parameter estimates Θ 404 (with parameter estimator 403), and making those estimates available to all processing elements 405.

The method continues with initializing symbols d̂(0) 408 to 'undecided' state, and making those symbols valid (based on input from the corresponding decoder 406). The method continues with computing d̂(1) (with MUD 405) using data $\vec{r}$ (m+1:m+M), Θ, and d̂(0), and outputting that result on path 407. The method continues with computing d̂(2) (with decode 406) using d̂(1), and outputting that result on path 408 (declare valid). Note that at this time, the decoded bits B are not written onto path 409. The method continues with computing d̂(3) (with MUD 405) using $\vec{r}$ (m+1:m+M), Θ, and d̂(2), and outputting that result on path 407.

Indexing through the process accordingly, the method continues with computing d̂(4) (with decode 406) using d̂(3), and outputting that result on path 408 (declare valid). Note that at this time, the decoded bits B are not written onto path 409. The method continues with computing d̂(5) (with MUD 405) using $\vec{r}$ (m+1:m+M), Θ, and d̂(4), and outputting that result on path 407. This computing of decoding and MUD is repeated, indexing appropriately. For the last iteration of the turbo loop, the method continues with computing decode 406 using d̂(2*($N_{turbo}$−1)+1), and writing the resulting decoded bits B onto path 409.

Note that the parameter estimation module 403 and decoder modules 406 can be implemented in conventional technology. However, variations will be apparent in light of this disclosure. For example, the parameter estimator can be configured as described in U.S. patent application Ser. No. 10/228,787, titled, "Parameter Estimator for a Multiuser Detection Receiver." The MUD module 405 can also be implemented in conventional technology, but are further configured as a windowing MUD module in accordance with the principles of the present invention. The details of the windowing function is discussed in more detail with reference to FIGS. 5 and 6.

Also, in a turbo-MUD, the prior information about the symbols is simply the output of the algorithm at the previous iteration. For this reason, a method of using MMSE MUD with prior information about the symbols should be used. One such method that can be employed by MUD modules 405 is described in detail in U.S. application Ser. No. 10/105,918, titled "System for Decreasing Processing Time in an Iterative Multi-User Detector System." Another such method is described in U.S. application Ser. No. 10/423,740, titled "Co-channel Interference Receiver." Numerous other realizations of MUD and corresponding architectures can be used here.

Windowed Multiuser Detection

Figure 5:
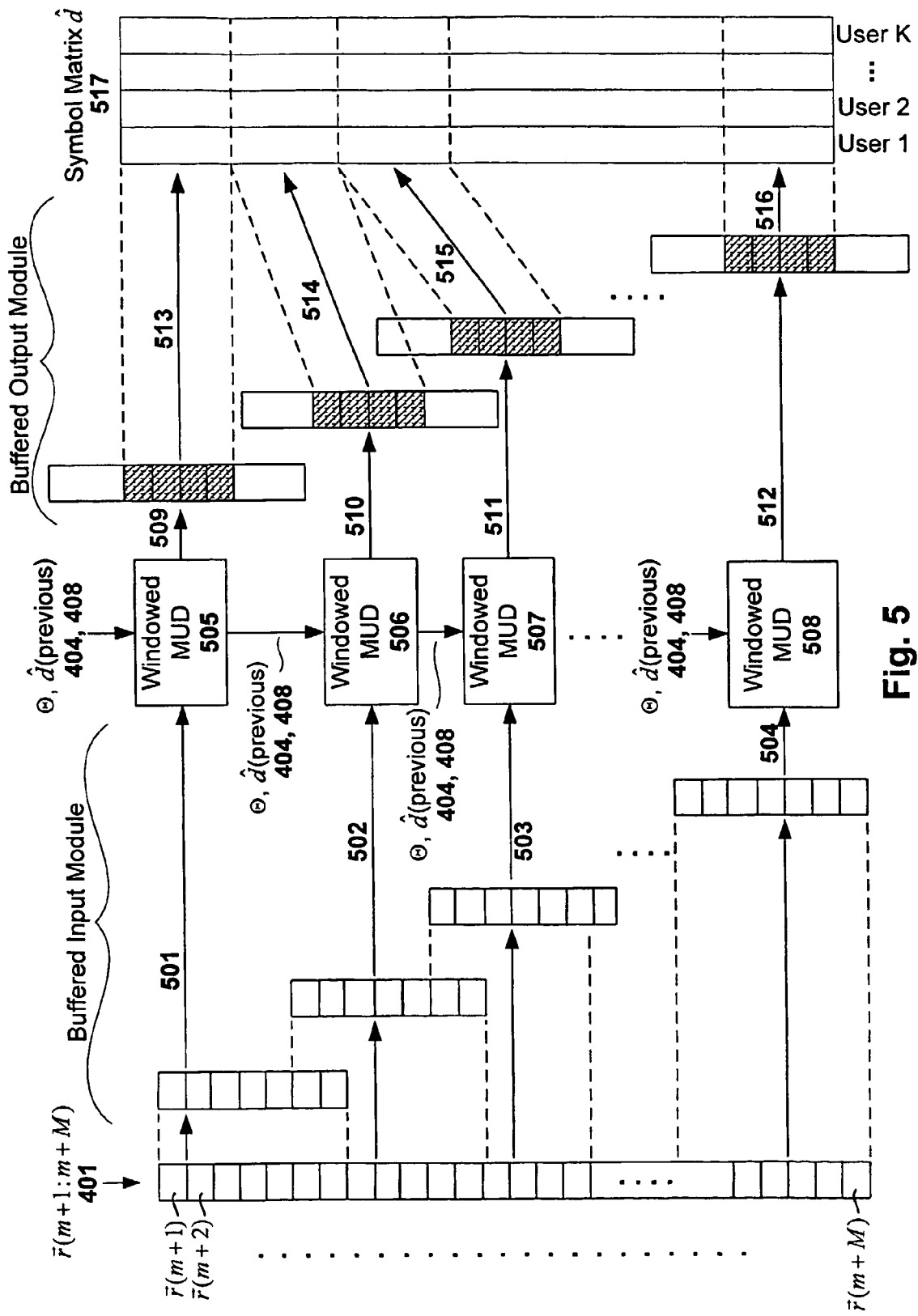
FIG. 5 illustrates a block diagram of a windowed multiuser detection receiver configured in accordance with one embodiment of the present invention.

FIG. 5 illustrates a block diagram of a windowed multiuser detection receiver configured in accordance with one embodiment of the present invention. In particular, the figure illustrates how individual windowed MUD modules of the receiver receive their data and write their respective results.

The received data $\vec{r}$ (m+1:m+M) 401 enters the windowed MUD processor, and is broken up into subwindows 501, 502, 503, and 504 via use of an input buffer or other data staging scheme. These subwindows are overlapping in time such that portions of the received data are included in both of two adjacent subwindows.

The size and overlapping of these subwindows is controlled in such a fashion that the symbols required to be computed by the windowed MUD modules 505, 506, 507, and 508 are supported by the data in each subwindow. The principle adaptation parameters of the algorithm are the number of symbols to be computed by each windowed MUD, and how far to advance between the individual windowed MUD modules. The number of symbols to be computed is the advance ($L_{keep}$), plus two times the number of MUD side symbols ($L_{side}$). Let $L_{windowed}=L_{keep}+2*L_{side}$ be the number of symbols to be computed, then the size of the subwindow to be used corresponds to the size of the vector r:

$$r_{windowed}=S_{windowed} \cdot d(\zeta+[1:L_{windowed}]). \qquad (3)$$

To further illustrate the data structuring, assume the following: there is one user, the data is sampled at one sample per symbol, there are three samples in a signature waveform, and there are 1 MUD side symbols (on each side, for a total of 2) and an advance of 1 symbol. For this case, $L_{windowed}=3$, and the MUD problem to be solved by the windowed MUD is $$\begin{bmatrix} r_w(\tau+1) \\ r_w(\tau+2) \\ r_w(\tau+3) \\ r_w(\tau+4) \\ r_w(\tau+5) \end{bmatrix} = \begin{bmatrix} s_w(1) & 0 & 0 \\ s_w(2) & s_w(1) & 0 \\ s_w(3) & s_w(2) & s_w(1) \\ 0 & s_w(3) & s_w(2) \\ 0 & 0 & s_w(3) \end{bmatrix} \cdot \begin{bmatrix} d(\zeta+1) \\ d(\zeta+2) \\ d(\zeta+3) \end{bmatrix}. \qquad (4)$$

$$\vec{r} \quad = \quad S \quad \cdot \quad \vec{d}$$

In this case, five samples of data are required to compute the three MUD symbols. Note too that the signature waveform $[s_w(1)\ s_w(2)\ s_2(3)]^T$ has been written into the S matrix in a particular format, with one (delayed) column for each symbol.

Further note that each of the windowed MUD modules (505, 506, 507, 508), once the processing is done, writes its data to the symbol matrix d̂ 517 in a particular way. More specifically, only the symbols from the 'advance' portion (central portion designated with shading) of the vectors 509, 510, 511, and 512 will be copied to the symbol matrix. All of the symbols referred to as MUD side symbols (non-shaded) will be discarded or otherwise ignored. This copying operation is diagrammed by the arrows 513, 514, 515, and 516 on FIG. 5. Note that the vectors 509, 510, 511, and 512 can be stored in an output buffer or other suitable staging mechanism at the output of the windowed MUD modules (505, 506, 507, 508), so that an output module can perform the copying to the symbol matrix. Further note that this buffering and/or output module can be programmed or otherwise integrated into the windowed MUD modules (505, 506, 507, 508).

In reference to the previous one-user example, this means that only the central symbol d(ζ+2) of the 509 vector [d(ζ+1) d(ζ+2) d(ζ+3)]$^T$ is written into the d̂ matrix 517. Each windowed MUD (505, 506, 507, 508) contributes one symbol to d̂ matrix 517 (now an L by 1 vector, because there is only one user), and as such there are L distinct windowed MUD modules required.

To further demonstrate, consider the situation where two users are being demodulated, with all other parameters held the same. In this case, the MUD equation to be solved would be:

$$\begin{bmatrix} r_w(\tau+1) \\ r_w(\tau+2) \\ r_w(\tau+3) \\ r_w(\tau+4) \\ r_w(\tau+5) \end{bmatrix} = \begin{bmatrix} S_1(1) & 0 & 0 & S_2(1) & 0 & 0 \\ S_1(2) & S_1(1) & 0 & S_2(2) & S_2(1) & 0 \\ S_1(3) & S_1(2) & S_1(1) & S_2(3) & S_2(2) & S_2(1) \\ 0 & S_1(3) & S_1(2) & 0 & S_2(3) & S_2(2) \\ 0 & 0 & S_1(3) & 0 & 0 & S_2(3) \end{bmatrix} \cdot \begin{bmatrix} d_1(\varsigma+1) \\ d_1(\varsigma+2) \\ d_1(\varsigma+3) \\ d_2(\varsigma+1) \\ d_2(\varsigma+2) \\ d_2(\varsigma+3) \end{bmatrix}. \quad (5)$$

Here, there are two signature vectors populating the S matrix: $s_1 = [s_1(1)\ s_1(2)\ s_1(3)]^T$, and $s_2 = [s_2(1)\ s_2(2)\ s_2(3)]^T$. This results in six symbols being computed, three for each user. In this example, the d̂ matrix 517 will have two columns, one for each user, and the symbols $d_1(\zeta+2)$ will fill the first column, and $d_2(\zeta+2)$ the second column.

Figure 6:
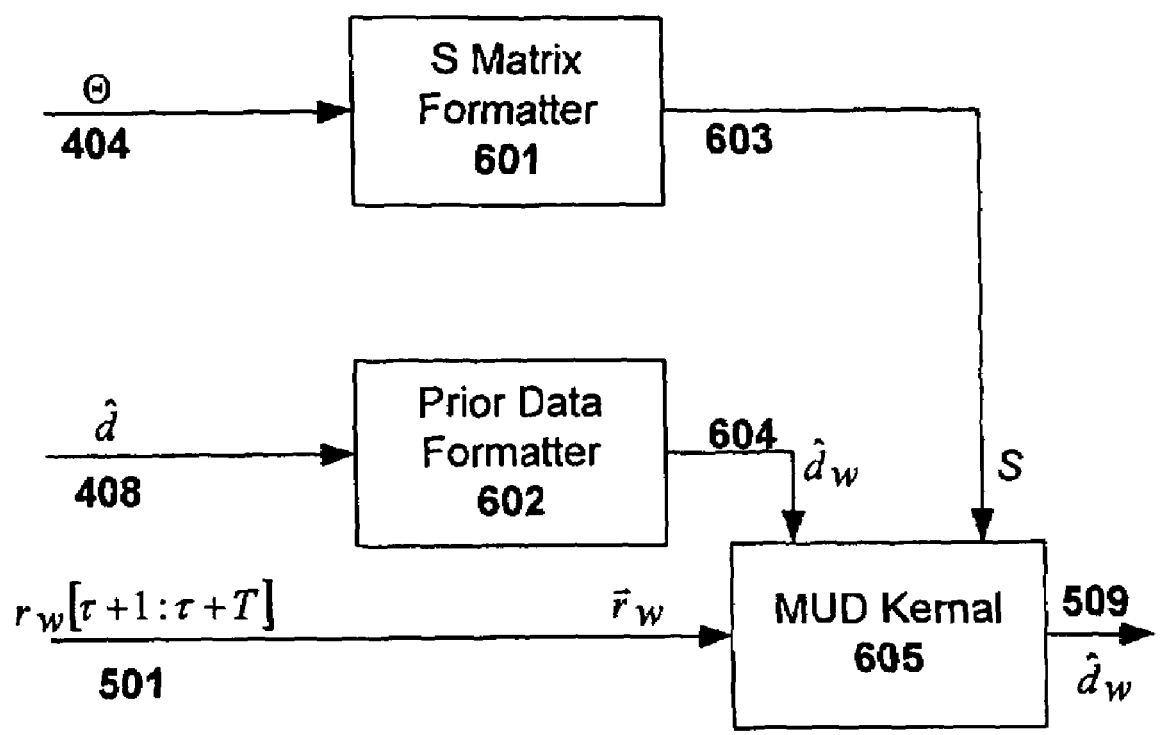
FIG. 6 illustrates the processing and architecture of a windowed MUD module in accordance with one embodiment of the present invention.

FIG. 6 illustrates the processing and architecture of a windowed multiuser detector (505-508) in accordance with one embodiment of the present invention. The windowed multiuser detector includes an S matrix formatter module 601, a prior data formatter module 602, and a MUD kernal 605. These components (as well as the input and output modules of FIG. 5) may be implemented in hardware, software, firmware, or any combination thereof. For example, each of components can be implemented as a set of instructions executing on one or more digital signal processors or other suitable processing environment. Note that the components may be integrated with one another to form a single a single module configured with the same functionality.

As can be seen, the parameter data Θ is provided on data line 404, driving the S matrix formatter 601. Amongst other parameters, the data Θ includes copies of the signature waveforms for each user to be demodulated. These sampled waveforms are written into the S matrix in a convolutional matrix format, with submatrices for each user situated left to right (laterally).

Within each submatrix, the waveform is progressively delayed by the number of samples corresponding to one transmitted symbol. In the previous example, this was one sample, but it is often more, typically four samples per symbol. It is not necessary that each windowed MUD module 505-508 use the same S matrix, although the form of each will be the same. Generally stated, each windowed MUD module receives corresponding S matrix data.

In some systems, a different waveform may be used for each symbol, but each of these waveforms would still be available in parameter data Θ 404. The S matrix formatter 601 would in this case just select the proper waveforms based on knowledge (also appended into parameter data Θ 404) of the corresponding subframe (501-504) being processed. This subframe identification can mathematically be expressed as a delay τ into the vector $r_w = r(m+1:m+M)$, so that T samples of $r_w$ starting at a delay of τ, written $r_w[\tau+1:\tau+T]$, are passed into the MUD kernal 605.

The function of the prior data formatter 602 is similar to that of the S matrix formatter 601. Recall first, that the symbols d̂ being passed around the turbo loop on paths 407 and 408 (FIGS. 4a and 4b) are stored in an L symbol by K user matrix 517. The function of the prior data formatter 602 is to read this matrix 517, and output a vector of symbols corresponding to the subwindow of data being processed by that windowed MUD module. Recalling Equations 4 or 5, this correspondence is:

$$r_w[\tau+1:\tau+T] \Leftrightarrow \hat{d}(\varsigma+1:\varsigma+L_w,1:K), \quad (6)$$

where the data delay τ is related to the symbol delay ζ by the oversampling rate D (number of samples per symbol), τ=D*ζ. The notation $\hat{d}(\varsigma+1:\varsigma+L_w,1:K)$ means the $L_w$ by K submatrix of the d̂ matrix 517 taken ζ rows down (all K columns are taken). The prior data formatter 602 then vectorizes this submatrix, reading column-wise, and outputs the $L_w \cdot K$ by 1 vector $\hat{d}_w$ on path 604. This formatting is essentially the inverse of the formatting made by paths 513-516 when the windowed MUD modules (505-508) write their results to the d̂ matrix 517.

With the data d̂ and parameters Θ thus formatted, the MUD kernal 605 can compute the symbol estimates, $\hat{d}_w$, to be written to path 509. It should be appreciated that at this point, most any MUD algorithm known to the art can be used to implement MUD kernal 605. However, according to the principles of the present invention, a modification is made to properly account for the windowing of the data and symbol decisions. In particular, the likelihood function (of the MUD kernal 605) is modified to reduce the impact of bit decisions at the edges of the window. As will be apparent in light of this disclosure, this modification can be embodied in several different algorithms, but the effect will be the same. The desired effect is to reduce the deleterious effects of unknown symbols (and their associated waveforms) outside the present window, on the centrally located bit decisions.

Windowed MUD Algorithms

The basic model for a multiuser detection system is $r_w = S \cdot d_w$, where the symbols $d_w$ are sought given the data $r_w$ and S matrix. The optimal solution can be thought of as an estimate of the symbols, so the answer may be written as $\hat{d}_w$ (an estimated quantity). In addition, prior data may be available on what the symbols are, summarized by the probability $p_d(d)$, which is in general, a multivariate probability density function.

In one embodiment, an approximate method of computing, this probability (for unit norm symbols such as BPSK or QPSK), can be represented mathematically as:

$$p_d(d, \hat{d}_w) = \prod_{l=1}^{L} p_{d(l)}(d(l), \hat{d}_w(l)) \approx \prod_{l=1}^{L} \left\{ 1 - \frac{1}{2} |\hat{d}_w(l) - d(l)| \right\}. \quad (8)$$

This functionality can be integrated into the MUD kernal 605. Note that in this equation, each symbol decision d(l) contributes to the overall probability, and that symbol decisions close to the prior data $\hat{d}_w(l)$ are very likely, or contribute a '1' to the product. The optimal MUD solution would be to choose the symbols that maximize the likelihood function as shown here:

$$\hat{d}_{w,new} = \underset{d}{\mathrm{argmax}}\{\Lambda'(d)\} \quad (9)$$

$$= \underset{d}{\mathrm{argmax}}\{2*\mathrm{Re}\{d'AS'r\} - d'S'Sd +$$

$$2\sigma^2 \ln\{p_d(d, \hat{d}_{w,old})\}\}.$$

U.S. application Ser. No. 10/105,918, titled "System for Decreasing Processing Time in an Iterative Multi-User Detector System", and U.S. application Ser. No. 10/423,740, titled "Co-channel Interference Receiver", each describe techniques to implement this maximization.

In equation 9, note that the contributions due to the prior probabilities (third term, $p_d(d,\hat{d}_w)$) can be separately accounted for algorithmically, and the likelihood simplified. If this is done, one particular MUD algorithm that can be employed here is the Minimum Mean Squared Error (MMSE) MUD algorithm, summarized by $$\hat{d}_{w,new} = (\sigma^2 I + AS^H SA)^{-1}(SA)^H r_w. \quad (10)$$

In accordance with the principles of the present invention, this solution is modified to account for the fact that the data being processed has been windowed. This modification entails assigning a different noise power $\sigma^2$ to each symbol estimate. If all of these separate noise powers are assembled into the $L_w \cdot K$ by 1 vector $\vec{\sigma} = [\sigma_1^2]$, then the windowed MUD kernal 605 can be written:

$$\hat{d}_{w,new} = (\mathrm{diag}\{\vec{\sigma}\} + AS^H SA)^{-1}(SA)^h r_w. \quad (11)$$

In one embodiment, the assigning of these separate noise powers to each symbol decision is carried out by assigning each symbol decision a nominal noise power of $\sigma_1^2 = \sigma^2$, and inflating the noise power near the edges of the window to account for the fact that unknown waveforms are overlapping the current window.

Figure 7:
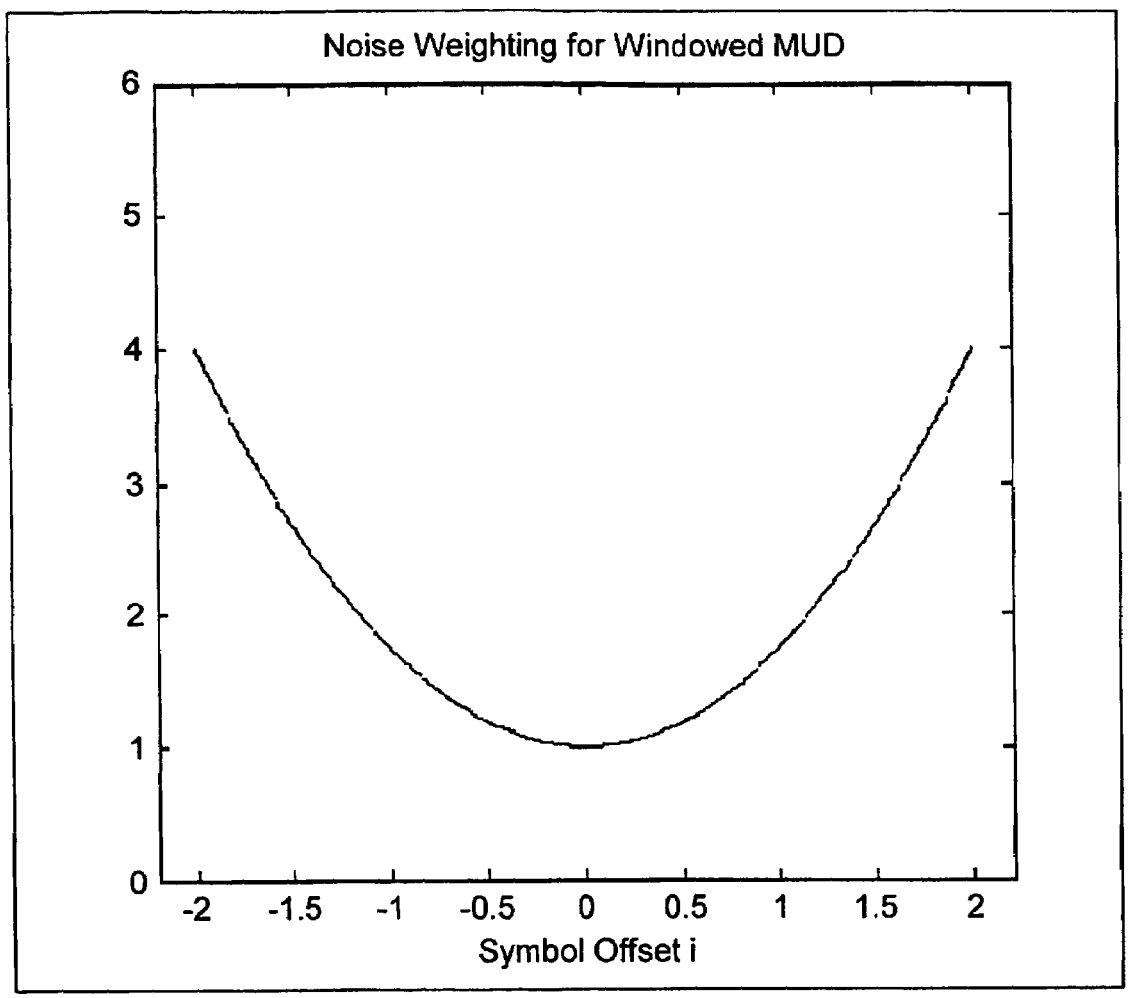
FIG. 7 illustrates an example noise weighting function for windowed MUD in accordance with one embodiment of the present invention.

This is written mathematically as:

$$\sigma_1^2 = c(|i - i_{central}|) \cdot \sigma^2, \quad (12)$$

where the weighting function $c(|i-i_{central}|)$ is designed to be '1' at the central symbol position $i_{central}$, and somewhat higher at the edges. An example noise weighting function for windowed MUD in accordance with one embodiment of the present invention is illustrated in FIG. 7, where a weighting of 4 is achieved at the edges of a $L_w=5$ symbol (two MUD side symbols) window. Note that the most central point of the windowed data has a weighting of 1.

In the multiuser case; K would be greater than 1, and this noise weighting would be repeated for each user being demodulated, for a total of $L_w \cdot K$ entries into $\mathrm{diag}\{\vec{\sigma}\}$. The present invention is not intended to be limited to a weighting function of any one precise shape. Rather, many shapes and means to compute these shapes may be used here, as will be apparent in light of this disclosure. These means may include, for example, adaptive noise estimation as the receiver is working, or a preprocessing step to be performed at initialization of the software.

Thus, windowed multiuser detection is enabled through an overlap and save iterative MUD demodulation scheme. Sub-block weighting of noise statistics are employed for an MMSE multiuser detector, while sub-block de-emphasis of path metrics are employed in an M-algorithm multiuser detector.

Methodology

Figure 8:
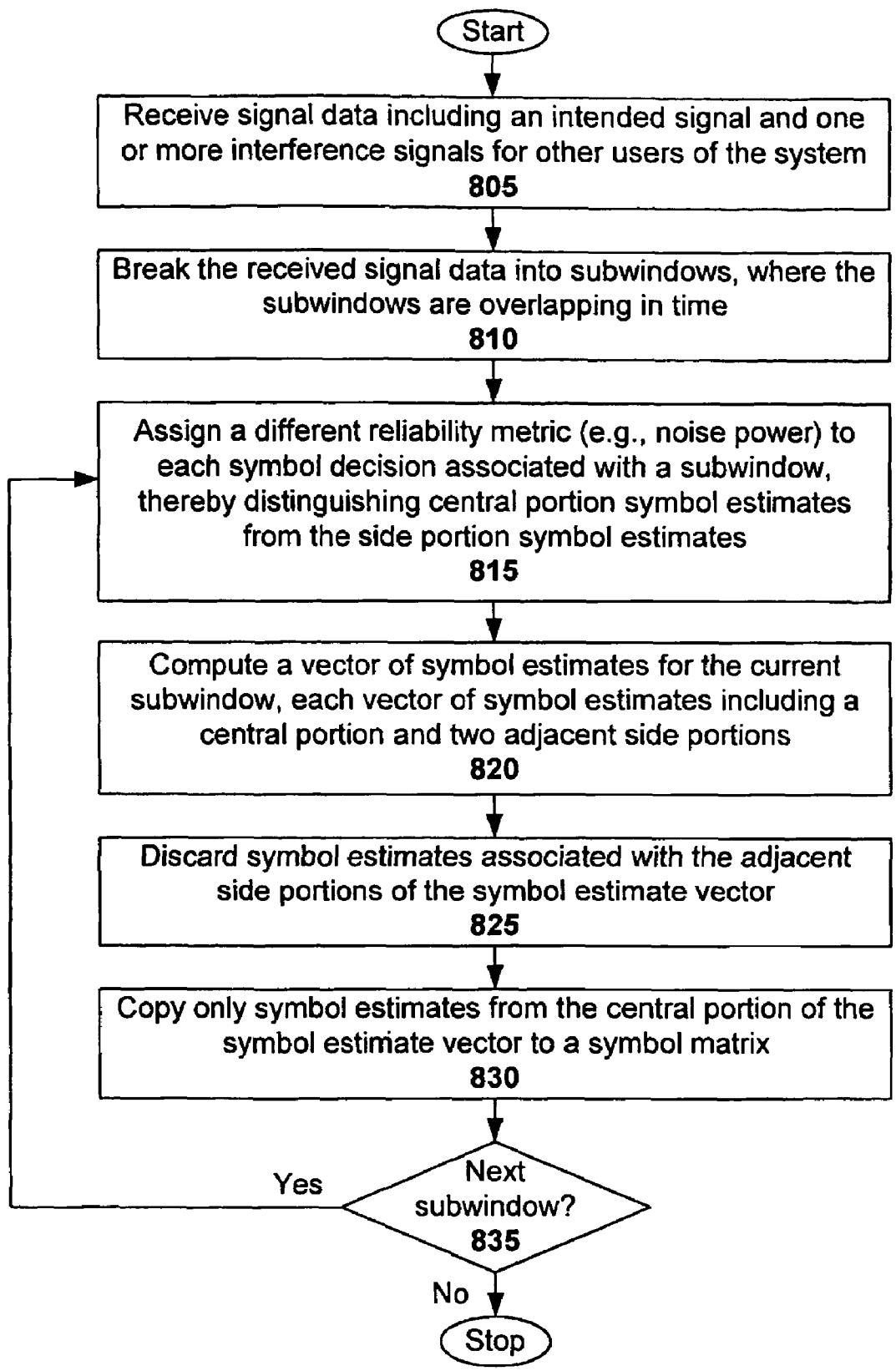
FIG. 8 illustrates a method for performing windowed multiuser detection in accordance with one embodiment of the present invention.

FIG. 8 illustrates a method for performing windowed multiuser detection in accordance with one embodiment of the present invention. This method can be carried out, for example, by the MUD receiver illustrated in FIGS. 4-6. The method begins with receiving 805 signal data including an intended signal for a user and one or more interference signals for other users of the system. The method proceeds with breaking 810 the received signal data up into subwindows, with each subwindow including data required to compute a number of symbol estimates (or bit estimates). The subwindows are overlapping in time such that portions of the received data are included in two subwindows.

The method may further include assigning 815 a different reliability metric (e.g., noise power) to each symbol decision (or each bit decision) associated with a subwindow, thereby enabling symbol estimates associated with the central portion of a symbol estimate vector to be distinguished from symbol estimates associated with the two adjacent side portions. In one such embodiment, assigning a different noise power to each symbol decision is carried out by assigning each symbol decision a nominal noise power, and inflating the noise power of symbol decisions associated with the two adjacent side portions, thereby designating unknown waveforms overlapping each subwindow. This assigning a different noise power to each symbol decision can be based on a noise weighting function, such as the function illustrated in FIG. 7.

The method operates sequentially on each of the subwindows, in the following manner. For a current subwindow of the data frame, the method includes computing 820 a vector of symbol estimates (or a vector of bit estimates) for that subwindow, each vector of symbol estimates including a central portion and two adjacent side portions. This computation generally includes the windowed data $\vec{r}$ (m+1:m+M), parameter estimation data Θ, and previously decoded symbols $\hat{d}(t)$ (if available)? as explained earlier.

In one particular embodiment, the computing 820 includes computing prior data that is indicative of the symbol estimates of the symbol estimate vector based on a multivariate probability density function. Each symbol estimate may contribute to an overall probability, and symbol estimates close to computed prior data are very likely. Contributions due to the prior probabilities may be separately accounted for algorithmically, thereby simplifying likelihood decisions as previously explained. Recall that the computing 815 of a vector of symbol estimates for each subwindow can be carried out, for example, with a minimum mean squared error MUD algorithm or an M MUD algorithm.

The method may further include discarding 825 symbol estimates included in the adjacent side portions of the current symbol estimate vector, and copying 830 only symbol estimates from the central portion of the current symbol estimate vector to a symbol matrix. The symbol matrix is an L by K matrix, where L is equal to the number of subwindows and K is equal to the number of users. Note that the discarding 825 and copying 830 can be facilitated by the assigning 820. A determination 835 is then made as to whether there is a next subwindow of the data frame to be processed. If so, steps 815 through 835 can be repeated. Otherwise, the method terminates and waits for the next turbo iteration, or frame of data.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for performing windowed multiuser detection in a multiuser communication system having a plurality of users, the method comprising:
   receiving signal data including an intended signal for a user and one or more interference signals for other users of the system;
   breaking the received signal data up into subwindows, each subwindow including data required to compute a number of symbol estimates said subwindow having less than a total number of received bits, where the subwindows are overlapping in time such that portions of the received data are included in two subwindows;
   computing a vector of symbol estimates for each subwindow, each vector of symbol estimates including a central portion and two adjacent side portions; and
   copying only symbol estimates from the central portion of each symbol estimate vector to a symbol matrix, the symbol matrix being an L by K matrix, where L is equal to the number of subwindows and K is equal to the number of users.

2. The method of claim 1 further comprising:
   discarding symbol estimates included in the adjacent side portions of each symbol estimate vector.

3. The method of claim 1 wherein computing a vector of symbol estimates for each subwindow includes computing prior data that is indicative of the symbol estimates of each symbol estimate vector based on a multivariate probability density function.

4. The method of claim 3 wherein each symbol estimate contributes to an overall probability, and symbol estimates close to computed prior data are very likely.

5. The method of claim 3 wherein contributions due to the prior probabilities are separately accounted for algorithmically, thereby simplifying likelihood decisions.

6. The method of claim 1 wherein computing a vector of symbol estimates for each subwindow is carried out with one of a minimum mean squared error algorithm and an M-algorithm.

7. The method of claim 1 wherein computing a vector of symbol estimates for each subwindow further comprises:
   assigning a different noise power to each symbol decision associated with a subwindow, thereby making symbol estimates associated with the central portion of a symbol estimate vector distinguishable from symbol estimates associated with the two adjacent side portions to facilitate the copying.

8. The method of claim 7 wherein assigning a different noise power to each symbol decision is carried out by assigning each symbol decision a nominal noise power, and inflating the noise power of symbol decisions associated with the two adjacent side portions, thereby designating unknown waveforms overlapping each subwindow.

9. The method of claim 7 wherein assigning a different noise power to each symbol decision is based on a noise weighting function.

10. The method of claim 1 further comprising: storing said subwindows in a buffer.

11. A windowed multiuser receiver for performing windowed multiuser detection in a multiuser communication system having a plurality of users, the receiver comprising:
    an input module adapted to receive signal data including an intended signal for a corresponding user and one or more interference signals for other users of the system, and to break the received signal data up into subwindows, each subwindow having less than a total number of received bits and including data required to compute a number of symbol estimates, where the subwindows are overlapping in time such that portions of the received data are included in two subwindows;
    one or more MUD kernals, each adapted to compute a vector of symbol estimates for a corresponding subwindow, each vector of symbol estimates including a central portion and two adjacent side portions; and
    an output module adapted to copy only symbol estimates from the central portion of each symbol estimate vector to a symbol matrix, the symbol matrix being an L by K matrix, where L is equal to the number of subwindows and K is equal to the number of users.

12. The receiver of claim 11 further comprising:
    one or more S matrix formatter modules, each adapted to receive parameter data including copies of signature waveforms to be demodulated for each user, and to provide S matrix data to a corresponding MUD kernal; and
    one or more prior data formatter modules, each adapted to receive corresponding prior symbol estimates, and to output to a corresponding MUD kernal a vector of symbols corresponding to the subwindow of data being processed.

13. The receiver of claim 11 wherein the output module is further adapted to discard symbol estimates included in the adjacent side portions of each symbol estimate vector.

14. The receiver of claim 11 wherein the one or more MUD kernals are each configured with one of a minimum mean squared error algorithm and an M-algorithm.

15. The receiver of claim 11 wherein the one or more MUD kernals are each further configured to assign a different noise power to each symbol decision, thereby making symbol estimates associated with the central portion of a symbol estimate vector distinguishable from symbol estimates associated with the two adjacent side portions.

16. The receiver of claim 15 wherein each of the one or more MUD kernals assigns each symbol decision a nominal noise power, and inflates the noise power of symbol estimates associated with the two adjacent side portions, thereby designating unknown waveforms overlapping each sub window.

17. The receiver of claim 11 wherein each of the one or more MUD kernals each includes a likelihood function that is configured to reduce the impact of bit decisions associated with the two adjacent side portions based on an assigned noise power reliability metric.

18. A method for performing windowed multiuser detection in a multiuser communication system having a plurality of users, the method comprising:
    receiving signal data including an intended signal for a user and one or more interference signals for other users of the system;

breaking the received signal data up into subwindows, where the subwindows are less than a total number of received bits and are overlapping in time such that portions of the received data are included in two or more subwindows;

computing a vector of bit estimates for a current subwindow, the vector including a central portion and two adjacent side portions;

copying only bit estimates from the central portion of the bit estimate vector to a bit matrix, the bit matrix being an L by K matrix, where L is equal to the number of subwindows and K is equal to the number of users; and repeating the computing and copying until each subwindow is processed.

19. The method of claim 18 further comprising:

assigning each bit decision associated with a subwindow a reliability metric that is functionally related to the temporal distance of the corresponding bit from the central portion, thereby distinguishing reliable bit estimates from non-reliable bit estimates to facilitate the copying.

20. The method of claim 19 wherein assigning each bit decision associated with a subwindow a reliability metric includes assigning individual noise statistics to each bit decision.

* * * * *